United States Patent [19]

Fritz, Jr.

[11] Patent Number: 4,473,919
[45] Date of Patent: Oct. 2, 1984

[54] WINDSHIELD WIPER BLADE

[75] Inventor: Charles T. Fritz, Jr., Wilmington, Del.

[73] Assignee: Smear Clear Wiper Corporation, Claymont, Del.

[21] Appl. No.: 500,545

[22] Filed: Jun. 2, 1983

Related U.S. Application Data

[63] Continuation-in-part of Ser. No. 426,195, Sep. 28, 1982, abandoned, and a continuation-in-part of Ser. No. 420,946, Sep. 21, 1982, abandoned.

[51] Int. Cl.³ ............................................. B60S 1/38
[52] U.S. Cl. ................................ 15/250.4; 15/250.36
[58] Field of Search ...................... 15/250.36–250.42

[56] References Cited

U.S. PATENT DOCUMENTS

| | | | |
|---|---|---|---|
| 2,039,716 | 5/1936 | Horton | 15/250.40 |
| 2,090,681 | 8/1937 | Kempel | 15/250.41 |
| 2,090,702 | 8/1937 | Rodrick | 15/250.40 |
| 2,179,451 | 11/1939 | Horton | 15/250.40 |
| 3,116,506 | 1/1964 | Browne et al. | 15/250.36 |

FOREIGN PATENT DOCUMENTS

| | | | |
|---|---|---|---|
| 760378 | 10/1956 | United Kingdom | 15/250.36 |
| 1269993 | 4/1972 | United Kingdom | 15/250.40 |
| 1460202 | 12/1976 | United Kingdom | 15/250.40 |

Primary Examiner—Peter Feldman
Attorney, Agent, or Firm—Lyman R. Lyon

[57] ABSTRACT

A windshield wiper blade made of a synthetic elastomeric material includes an elongated body having a longitudinal axis; at least three side-by-side, longitudinally extending wiping ribs integral with the body, the wiping ribs projecting outwardly from the body and having outer ends lying in an arc which is concave toward the longitudinal axis of the body, the wiping ribs being constructed and arranged such that there is a squeegee rib with at least one scraping rib on each side thereof, the squeegee rib having a greater radial length than the scraping ribs; and a mounting rib integral with the body and projecting outwardly therefrom at a location essentially diametrically opposite the squeegee rib, the mounting rib providing a longitudinal extending hinge about which the body can swing in either direction, the arrangement being such that when the blade moves against a windshield the squeegee rib and the scraping rib or ribs on the side thereof facing in the direction of movement engages the windshield and the scraping rib or ribs on the other side of the squeegee and facing in a direction opposite blade movement is out of contact with the windshield.

4 Claims, 5 Drawing Figures

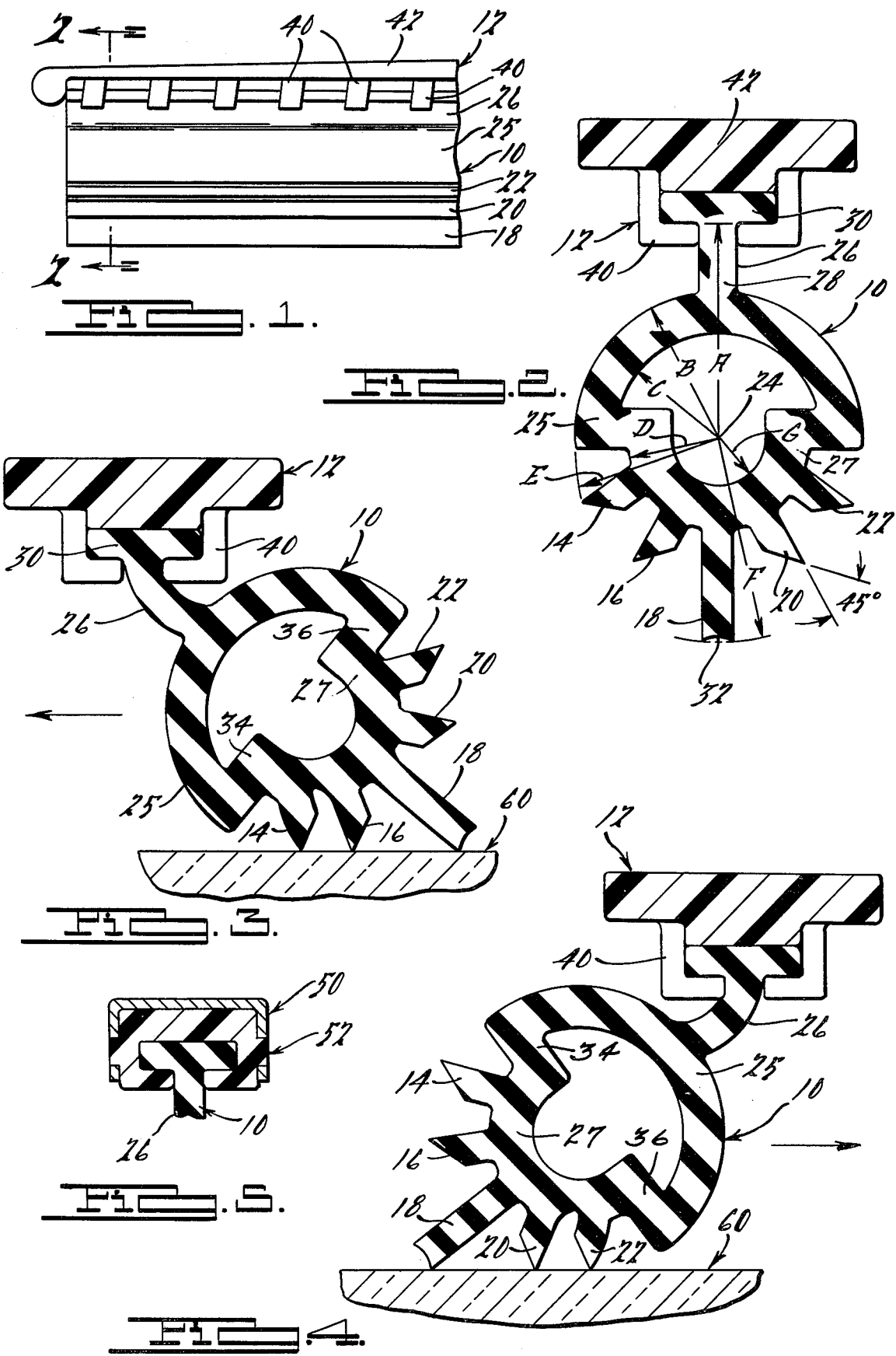

WINDSHIELD WIPER BLADE

CROSS-REFERENCE TO RELATED APPLICATIONS

This application is a continuation-in-part of applicant's copending applications Ser. No. 426,195, filed Sept. 28, 1982, now abandoned, and Ser. No. 420,946, filed Sept. 21, 1982.

BACKGROUND OF THE INVENTION

Windshield wiper blades are used to wipe away snow, sleet, rain water or condensed moisture along with oil, insects, tree sap, dirt and other foreign matter from a vehicle windshield. The blades should have a long, useful life to avoid frequent replacement. However, it is well recognized that known wiper blades develop a tendency to streak or smear and to wear out in the sense that longitudinal portions of the length of the blade cease to perform a useful cleaning action after a relatively short period of use. These disadvantages are difficult to eliminate because of the large number of variables, such as chemical resistance to ozone and sunlight, tear resistance, flexibility, tensile strength, hardness, rigidity and abrasiveness of the blade and the uniformity of wiping pressure and contact with the windshield along the length of the blade. Many attempts have been made to improve wiper blade performance, as by providing special contours in the cross-section of the blade especially the wiping rib or ribs, by selection of blade material, by chemical treatment of the blade and by varying the design of the blade holder. Nevertheless, the problem of streaking or smearing persists.

The following U.S. patents are known to deal with various aspects of windshield wiper blades, including blade contour, material of construction and manufacturing techniques: U.S. Pat. Nos. 4,103,385; 3,903,560; 3,636,583; 3,566,432; 2,090,702; 2,011,015; 2,179,451; 1,940,329 and De. 212,743.

SUMMARY OF THE INVENTION

The principal object of the present invention is to provide a windshield wiper blade which has improved non-streaking characteristics and longer operating life than blades heretofore known. This object is achieved by providing the blade with a unique tubular body having a plurality of specially shaped and arranged parallel ribs which engage the windshield in a special way during each wiping stroke. More specifically, the blade has a central squeegee rib of unique cross section with two scraping ribs, also of unique cross section, on each side of the squeegee rib. The size, shape and arrangement of the ribs is such that in one direction of movement of the blade over the windshield the scraping ribs on one side of the squeegee rib, i.e., the side facing in the direction of blade movement, contact the glass and precede one edge of the squeegee rib across the glass, while the scraping ribs on the other side of the squeegee rib, i.e., the side facing opposite to the direction of blade movement, and the opposite edge of the squeegee blade remain out of contact with the glass. When the direction of the blade is reversed by the wiper mechanism, the blade rotates slightly about an axis parallel to the longitudinal dimension of the blade and thereby brings the scraping ribs on the opposite side of the squeegee rib into contact with the windshield in position to precede the opposite edge of the squeegee rib across the glass. Rotation of the blade also brings the tubular body into proper position for pushing heavy debris or snow ahead of the blade and supporting the blade against lateral distortion.

The blade configuration comprises a tubular body portion made up of two semi-circular sections of different diameter connected by radially extending shoulders. Five ribs project from the smaller diameter sections generally radially with respect to the longitudinal axis of the body. The middle rib of the five constitutes the squeegee rib and is longer radially than the two scraping ribs. Diametrically opposite the squeegee rib is a T-shaped mounting rib which serves the dual purpose of providing a means by which the blade is attached to the windshield wiper mechanism, and functioning as a hinge which allows the blade to rotate at the reversal point of each wiping stroke so as to engage the scraping ribs on opposite sides of the squeegee rib with the windshield in the manner described above.

The preferred material for the blade is synthetic rubber, particularly an ethylenepropylene-diene polymer, such as "Nordel" manufactured by E. I. duPont de Nemours & Co., Inc. This material has been found to have an excellent combination of physical and chemical properties and it can be extruded in the multi-ribbed configuration described above. In particular, this material has been found to be extremely durable in both the mechanical and chemical sense and to have an excellent balance of hardness, rigidity, flexibility, abrasive characteristics and resilience, such that a constructed embodiment of the present invention as described herein exhibits superior performance in terms of non-smear, non-sqweak operation and long service life.

The extruded multi-ribbed blade of this invention is further unique in that it can be very easily used to replace worn-out wiper blades of any design or length by cutting the required length from a longer length and then attaching the cut length to an existing wiper blade backing member with a simple universal clip. The seller does not need to stock a large number of different pre-cut lengths; he merely purchases from the manufacturer a supply of clips and a long length of extruded blade in roll form or individual packages of a blade which would be the longest needed for any windshield (automotive, marine or aircraft). Whatever length is required by the customer is cut to size and then attached to the customer's existing wiper blade holder. The blade does not have to be contoured to fit an existing wiper blade holder because the clips are designed to cooperate with the previously mentioned mounting rib. The clips are also designed to cooperate with all or essentially all existing wiper blade holders. As a result, the blade is a universal replacement blade in that it can be cut to the necessary length and easily attached to substantially all existing wiper blade holders.

BRIEF DESCRIPTION OF THE DRAWINGS

FIG. 1 is a side elevational view of the wiper blade of the present invention mounted in a complementary wiper arm.

FIG. 2 is a transverse cross-sectional view of the blade taken along the line 2—2 of FIG. 1.

FIG. 3 is a view similar to FIG. 2 with the blade in contact with a windshield and moving to the left.

FIG. 4 is a view similar to FIG. 3 with the blade moving to the right.

FIG. 5 is a cross-sectional view of a blade in a universal mounting clip.

DETAILED DESCRIPTION OF THE PREFERRED EMBODIMENT OF THE INVENTION

A wiper blade 10 in accordance with a constructed embodiment of the instant invention comprises an extruded synthetic polymeric elastomer blade adapted to be accepted in a wiper blade holder 12. The blade 10 comprises five integral ribs 14, 16, 18, 20 and 22 which extend the length of the blade 10 and project generally radially relative to a longitudinal axis 24 of an upper tubular body portion 25. The central rib 18 comprises a squeegee rib and the two ribs 14, 16 and 20, 22 on opposite sides of the squeegee rib 18 are scraping ribs. As will be described in greater specificity, the squeegee rib 18 is slightly longer than the scraping ribs 14, 16, 20 and 22.

Referring to FIG. 2, the dimensional relationships between the upper tubular body portion 25, a support rib 26, a lower tubular body portion 27, and the ribs 14–22 are important to proper function of the blade 10.

In a constructed embodiment of the invention, the dimensions set forth in the following table, as applied to the demensions of FIG. 2 of the drawing, resulted in a wiper blade that exhibited exceptional wiping characteristics:

| Dimension | Measurement in Inches |
|---|---|
| a | .300–.315 |
| b | .210–.225 |
| c | .160 |
| d | .165 |
| e | .250 |
| f | .350 |
| g | .095 |

It is to be noted that the angle between the ribs 14, 16, 18, 20 and 22 is approximately 30° and the included angle of the points on the ribs 14, 16, 20 and 22 is approximately 45°.

It is also to be noted that the squeegee rib 18 has a concave end face 32 whereby a relatively sharp edge is presented to the surface being wiped.

The radially projecting generally T-shaped support rib 26 is defined by a leg portion 28 and a top flange portion 30. The leg portion 28 is sufficiently flexible to serve as a hinge when the top portion 30 is fixedly secured in the wiper blade holder 12. This form of hinge is known in the art as shown in, for example, the aforementioned U.S. Pat. Nos. 3,903,560 and 4,103,385. The flange portion 30 of the support rib 26 may be contoured as desired, provided that the contour can be gripped by the blade holder 12 in a manner that precludes relative rotation therebetween.

As seen in FIG. 1, the blade holder 12 is of channel-shaped cross section having inwardly facing spaced-apart clip portions 40 for retention of the top flange 30 of the blade 10. A web portion 42 of the blade holder 12 is adapted to be connected to the arm (not shown) of the wiper drive mechanism in the conventional manner.

As seen in FIG. 5, the wiper blade 10 of the present invention may be secured to a conventional blade holder 50 by individual spaced-apart clips 52 which are complementary to the T-shaped rib 26 on the blade 10. The external configuration of the clips 52 may be adapted to any desired arm.

As discussed previously, the preferred material for the blade 10 is extruded synthetic rubber, particularly ethylene-propylene-diene polymer. Such material and others are disclosed for wiper blade use in the aforementioned U.S. Pat. No. 4,103,385.

In accordance with one feature of the instant invention, the upper portion of the tubular body portion 25 of the blade 10 is larger in diameter than the lower portion 27 thereof so as to function as a snow and ice pusher, reducing scraping loads on the scraping ribs 14, 16 or 20, 22. Moreover, because the lower tubular body portion 27 is smaller in diameter than the upper body portion 25, it provides in conjunction with a pair of oppositely radially extending shoulders 34 and 36, a relatively stable support platform for the ribs 14–22.

FIGS. 3 and 4 illustrate the blade 10 as it moves in opposite directions over a windshield 60. In FIG. 3, the blade 10 is moving to the left as indicated by the arrow. In this mode, the body 25 of the blade 10 has rotated slightly counterclockwise due to the friction between it and the windshield 60 and due to the flexibility of the neck portion 28 of the support rib 26. In this position the scraping ribs 14 and 16 and the squeegee rib 18 are in contact with the windshield 60. In the event of snow on the windshield 60, the upper body portion 25 of the blade 10 functions as a pusher. Moreover, the shoulders 34 and 36 function to stiffen the blade 10 against lateral deflection insuring proper contact of the ribs 14, 16 and 18 with the windshield 60.

The primary action of the scraping ribs 14 and 16 is to clear away heavy rain, snow, sleet and foreign material such as insects and road dirt. Ordinarily, the ribs 14 and 16, being shorter and hence less flexible than the rib 18, are flexed to a lesser extent than the rib 18 due to contact with the windshield 60. The edge of the squeegee rib 18 in contact with the windshield 60 performs a squeegee action, i.e., removal of essentially all liquid from the windshield 60.

When the blade 10 reaches the end of its stroke and reverses direction, as illustrated in FIG. 4, the blade 10 rotates clockwise as a result of friction between the blade 10 and the windshield 60, flexibility of the neck portion 28 of the support rib, and the inherent resilience of the blade 10 due to its tubular construction. It is also to be noted that the unique tubular cross section of the blade 10 maximizes the ability thereof to conform to contours of the windshield 60 while minimizing lateral deflection and its resultant distortion of the ribs 14–22. It will be seen that the edges of all the ribs are sharp at the point of contact with the windshield.

While the preferred embodiment of the invention has been disclosed, it should be appreciated that the invention is susceptible of modification without departing from the scope of the following claims.

I claim:

1. A windshield wiper blade made of a synthetic elastomeric material comprising an elongated body having a longitudinal axis,
   a longitudinally extending squeegee rib integral with said body and extending radially therefrom,
   a plurality of longitudinally extending scraping ribs integral with said body,
   said scraping ribs projecting radially outwardly from said body and having outer edges lying generally in an arc generated about said longitudinal axis,
   said squeegee rib having a greater radial length than said scraping ribs, and
   a mounting rib integral with said body and projecting radially outwardly therefrom in a direction and at a location diametrically opposite said squeegee rib.

said body comprising an upper semi-circular section for the support of said mounting rib and a lower semi-circular section of relatively smaller diameter than said upper section for the support of said scraping and squeege ribs, the upper and lower sections of said body being connected by a pair of radially extending shoulders to effect lateral stiffening of said blade, the inherent flexibility of said mounting rib providing a longitudinally extending hinge about which said body can swing in either direction, the arrangement being such that when said blade moves against a windshield the squeegee rib and at least one scraping rib on the side thereof facing in the direction of movement of said blade engage the windshield.

2. A wiper blade as in claim 1 wherein there are two scraping ribs on each side of said squeegee rib.

3. A wiper blade as in claim 1 wherein said shoulders are substantially the same lengths as said scraping ribs.

4. A wiper blade in accordance with claim 1 wherein said scraping ribs have a sharp edge defined by the intersection of a leading rib sidewall extending generally radially with respect to the longitudinal axis of said upper and lower semi-circular sections and a trailing rib sidewall extending at an angle of approximately forty-five degrees to said leading rib sidewall and angled toward said squeegee rib.

* * * * *